United States Patent [19]
Hjermstad

[11] 3,774,654
[45] Nov. 27, 1973

[54] FUEL TRANSFER APPARATUS
[76] Inventor: Donald A. Hjermstad, P.O. Box 17, Florence, S. Dak. 57235
[22] Filed: Mar. 29, 1971
[21] Appl. No.: 128,705

Related U.S. Application Data
[63] Continuation-in-part of Ser. No. 827,542, May 26, 1969.

[52] U.S. Cl.................... 141/42, 137/433, 141/382
[51] Int. Cl............................................. B65b 31/06
[58] Field of Search.................... 137/202, 205, 433; 141/39–43, 59, 198, 199, 289, 303, 340, 363, 141/367–370, 379, 382, 383, 389, 231; 220/24 C, 24 GT; 285/177

[56] References Cited
UNITED STATES PATENTS

| | | | |
|---|---|---|---|
| 541,876 | 7/1895 | Paige et al. | 137/202 |
| 1,782,496 | 11/1930 | Anchelevich | 220/24 C X |
| 1,913,078 | 6/1933 | Hays | 141/42 |
| 2,130,059 | 9/1938 | Bosh et al. | 141/43 |
| 2,225,844 | 12/1940 | Pye | 141/43 |
| 2,227,611 | 1/1941 | Walleser | 141/42 |
| 2,325,674 | 8/1943 | Gustafson | 141/42 |
| 2,650,747 | 9/1953 | Rinne | 141/42 |
| 2,661,886 | 12/1953 | Speer | 141/42 |
| 2,928,436 | 3/1960 | Wendrow et al. | 141/231 X |
| 3,227,524 | 1/1966 | White | 137/433 X |

FOREIGN PATENTS OR APPLICATIONS

| | | | |
|---|---|---|---|
| 1,312,406 | 11/1962 | France | 141/199 |
| 808,934 | 7/1951 | Germany | 137/202 |

Primary Examiner—Houston S. Bell, Jr.
Attorney—Robert C. Baker

[57] ABSTRACT

Farm tractors, farm implements, and construction vehicles are refueled in the field by a flexible fuel line extending from a supply tank on a service vehicle, the flow of fuel from the supply tank being induced by utilizing the intake manifold of the service vehicle engine to create a suction effect in the fuel tank of the vehicle being refueled. A vacuum line is permanently connected to the suction manifold of the service vehicle and attached at its opposite end to a filler assembly which is removably coupled to the inlet fitting of the fuel tank being filled. Optional vertically adjustable means incorporated within the filler assembly serves to permit the full filling of a fuel tank regardless of the height of its inlet fitting.

The filler assembly itself, in the preferred embodiment, comprises a composite article including a unitary body of material with the fuel and vacuum passage therein, and special control means for the vacuum passage in combination therewith. The control means includes a float-actuated vacuum shut-off valve assembly, a hand-operated valve, and a pressure relief valve. The relative relationships for the fuel and vacuum passages in the filler assembly and the control means are critical.

10 Claims, 10 Drawing Figures

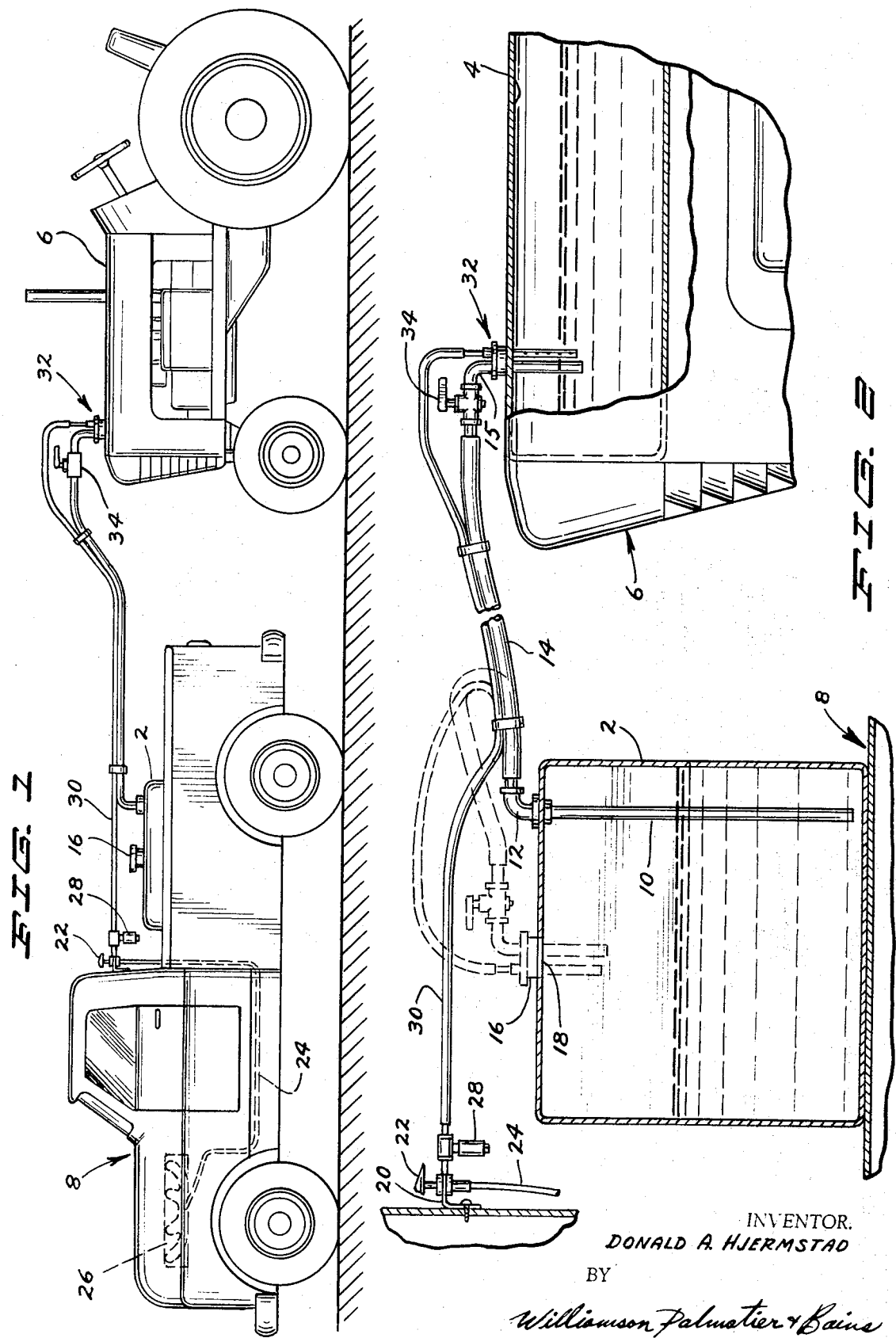

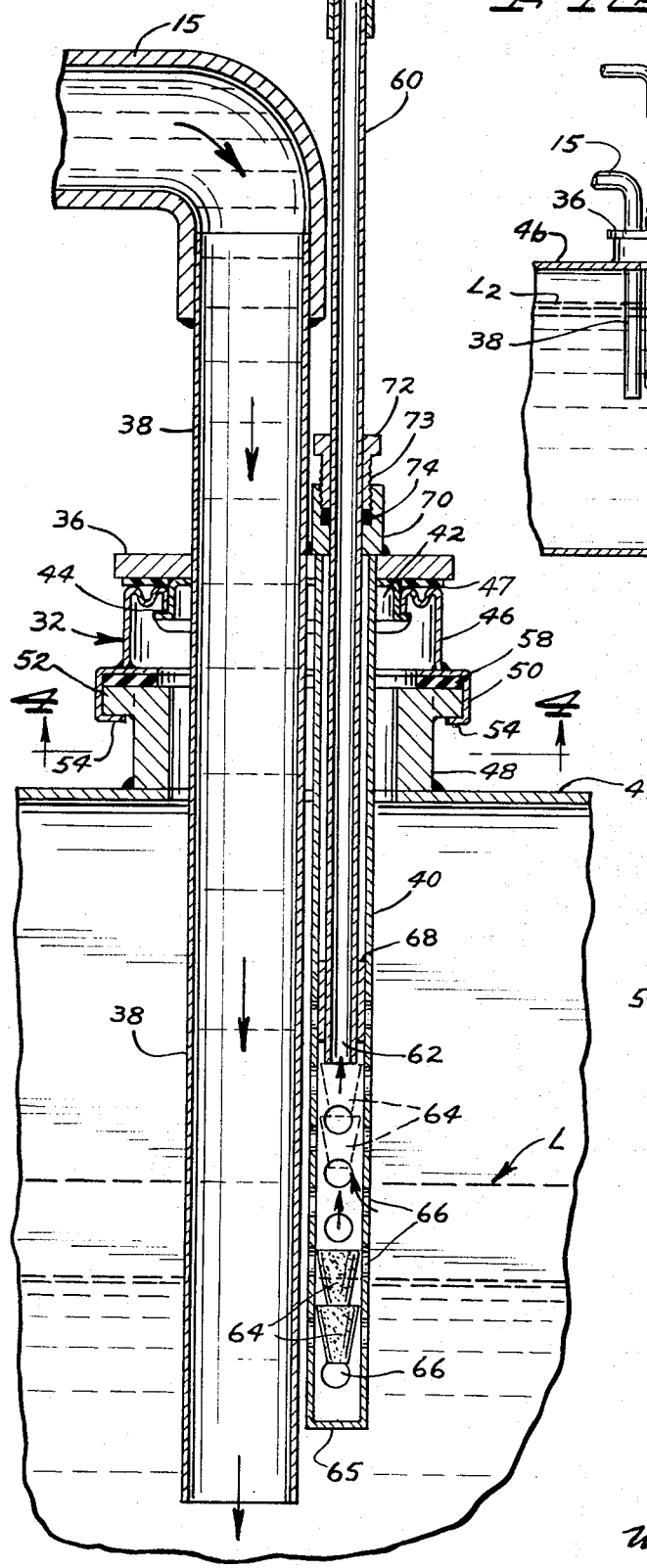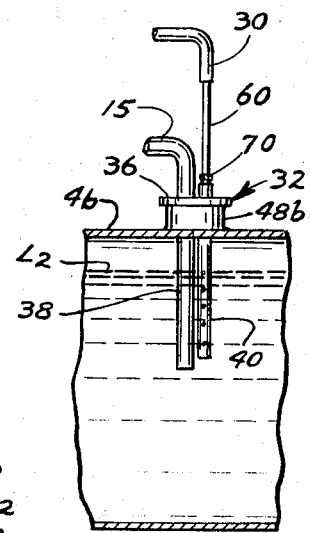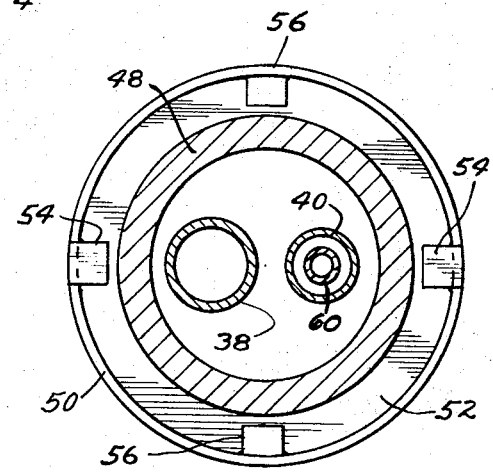

PATENTED NOV 27 1973 3,774,654
SHEET 3 OF 3
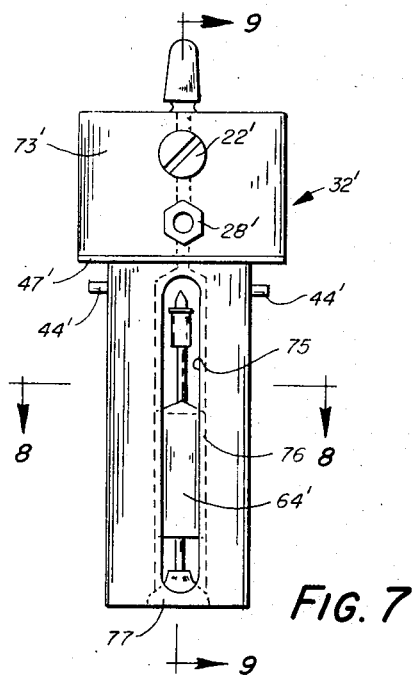
FIG. 7
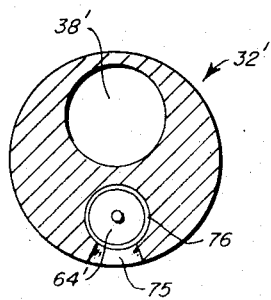
FIG. 8
FIG. 9
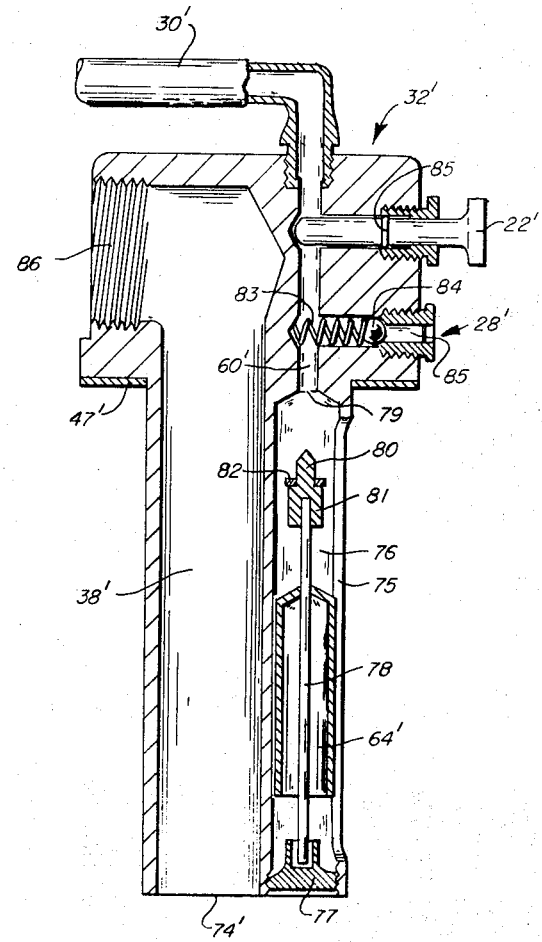
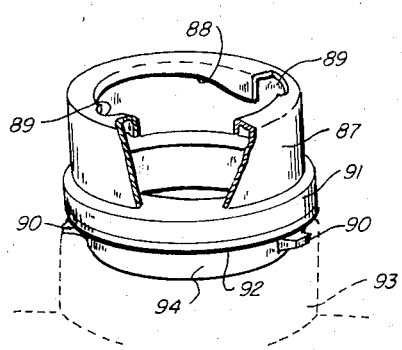
FIG. 10
INVENTOR.
DONALD A. HJERMSTAD
BY
Robert E. Baker
ATTORNEY

FUEL TRANSFER APPARATUS

This application is a continuation-in-part of my application, Ser. No. 827,542, filed May 26, 1969.

BRIEF SUMMARY OF THE INVENTION

This invention relates to a new fuel transfer apparatus and system, and particularly to a new composite filler assembly article for suction refueling of fuel tanks.

The fuel transfer apparatus of this invention is particularly characterized by filling apparatus comprising a vacuum conduit permanently connected to the suction manifold of a service vehicle and a fuel line connected to a fuel supply tank on the service vehicle, the vacuum conduit and fuel line being attached to a filler assembly adapted to be removably coupled to the inlet fitting of a fuel tank to be filled. A refueling operation is quickly and conveniently accomplished in the field by simply extending the filler assembly from its storage point on the service vehicle to the inlet fitting of the fuel tank on a farm or construction vehicle. With the engine of the service vehicle running, the filling operation is commenced by simply opening valves permanently installed in the vacuum conduit and the flexible fuel line. The low pressure created within the fuel tank being filled by the suction effect of the service vehicle engine establishes a pressure differential which induces the flow of fuel from the supply tank through the fuel line and the filler assembly into the tank being filled. Thus, an important feature of the invention is that of substantially air-tight engagement of the filler assembly article on the inlet for the tank being refueled, and simultaneously plugging any air outlets or breather ports in the tank being refueled, if there are any such ports.

As a particularly beneficial aspect of my invention, I incorporate an adjustable fuel level feature within the filler assembly by means of which compensation may be made for the height of the inlet fitting on the tank being filled so that the tank may be filled to a predetermined liquid level. I accomplish this by providing for the vertical adjustment of the float device utilized to shut-off the vacuum tube to stop the flow of fuel, or by providing a vertically adjustable vacuum tube on the filler assembly to connect the vacuum conduit with the interior of the tank being filled. The lower end of the adjustable vacuum tube serves as a valve port against which a float element seats at a predetermined liquid level. By raising or lowering the adjustable vacuum tube, the liquid level at which the float element closes the vacuum tube may be adjusted as desired.

An especially critical feature of the invention is the combination of relationships between the fuel passage and vacuum passage of the composite filler assembly, as well as the various control means for the vacuum passage. The relationship of the fuel passage to the vacuum passage and control means for it obviates problems of control interference caused by the inflow of fuel to the tanks being filled. The control elements of especial significance are a float-actuated vacuum shut-off valve assembly, a manually operated hand valve for turning off the vacuum suction, and a pressure relief valve. The teaching hereof is adaptable for suction refueling of even thin walled and therefore relatively easily collapsed fuel tanks; and this is possible because of the various control features taught herein.

These and other objects and advantages of my invention will become readily apparent as the following description is read in conjunction with the accompanying drawings wherein like reference numerals have been used to designate like elements throughout the several views.

BRIEF DESCRIPTION OF THE DRAWINGS

FIG. 1 is a side elevation view showing the manner in which a service vehicle is used to supply fuel to a farm vehicle;

FIG. 2 is a schematic showing, partially in section, of the supply tank, the fuel transfer apparatus, and a tank being filled;

FIG. 3 is a vertical section view showing one embodiment of the filler assembly of this invention;

FIG. 4 is a horizontal section view taken along lines 4—4 of FIG. 3 and showing a connection between an inlet fitting on a fuel tank and the filler assembly of this invention;

FIGS. 5 and 6 are side elevation views showing the manner in which the vertically adjustable, liquid level control feature of this invention may be utilized to fill fuel tanks having different height inlet fittings to the same level;

FIG. 7 is a side elevation of the preferred composite filler assembly article hereof;

FIG. 8 is a sectional view taken on lines 8—8 of FIG. 7;

FIG. 9 is a sectional view taken on lines 9—9 of FIG. 7; and

FIG. 10 is a schematic perspective view of a coupling adaptor, with the pre-existing fuel tank inlet shown in phantom.

DESCRIPTION OF THE PREFERRED EMBODIMENTS

In FIGS. 1 and 2, I have shown a fuel supply tank 2, and a fuel tank 4 of a vehicle 6 being refueled. For illustrative purposes, vehicle 6 is shown as a farm tractor, however, it will be appreciated that any type of vehicle, particularly farm implements and various types of construction vehicles such as bulldozers and earth movers may be refueled by the apparatus of this invention. Supply tank 2 is carried on a service vehicle 8 shown in the form of a pick-up truck. Depending downwardly into supply tank 2 is a delivery tube 10 which extends upwardly through an opening in tank 2 and is connected to a fitting 12 to which a flexible fuel line 14 is attached. A separate inlet fitting 16 communicating with the interior of supply tank 2 through a second aperture 18 therein serves a useful storage purpose hereinafter described. Mounted on the rear of the cab of vehicle 8 by means of a bracket 20 is a two-way hand valve 22 which is connected by way of flexible tube 24 with the intake manifold 26 of the engine of vehicle 8. The outlet port of valve 22 is connected to a pressure relief valve 28 to which a flexible vacuum tube 30 is coupled. Both the hand valve 22 and the pressure relief valve 28 serve as control elements in the vacuum line.

Fuel transfer line 14 and vacuum tube 30 are placed in fluid flow communication with the interior of a tank 4 to be filled by means of a filler assembly 32 to which they are connected. A hand valve 34 (which is optional) is positioned in fuel line 14 adjacent to its point of connection to filler assembly 32. Valve 34 provides a positive shut-off control of fuel line 14 in certain applications (as where gravity flow occurs in those cases where the tank being filled is below the supply tank), as hereinafter explained. Filler assembly 32 may take various forms, one embodiment thereof being shown in FIG. 3, with the preferred embodiment thereof in FIGS. 7–9 inclusive.

Referring now to FIG. 3, filler assembly 32 is comprised of transverse plate 36 and a fuel conduit 38 and vacuum tube 40 secured thereto to provide an integral assembly. Conduit 38 and tube 40, each laterally disposed with respect to the other, serve as first and second passage means for placing fuel line 14 and vacuum tube 30 respectively in fluid flow connection with the interior of tank 4. Fuel conduit 38 and vacuum tube 40 are preferably affixed to plate 36 by welding; and the relative relationships of size and dependency of each into the tank are as illustrated in the drawing. Secured to the underside of plate 36 is a closure cap 42 having a pair of laterally projecting locking lugs 44 by means of which it may be twisted into locking engagement with a fuel tank fitting of the well known type having a pair of diametrically opposed slots therein for receiving locking lugs 44. As illustrated in the drawing, the closure elements are axially lateral to the tubular bodies for the fuel and vacuum passages extending through the closure cap. In the event that the fuel tank being filled does not have such a fitting adapted to receive twist-tight closure cap 42, then an adaptor fitting may be employed to couple filler assembly 32 to the particular inlet fitting on the tank being filled. For illustrative purposes, I have shown an adaptor 46 constructed at its upper end to receive locking lugs 44 in twist-tight engagement therewith. A gasket 47 provides a tight seal between plate 36 and adaptor 46. The lower end of adaptor 46 is constructed to couple to an inlet fitting of the type shwon at 48. Cylindrical segment 50 of adaptor 46 fits down over upper shoulder 52 on fitting 48, and is secured thereto by a pair of inwardly extending locking lugs 54. Adaptor 46 is coupled to inlet fitting 48 by sliding locking lugs 54 downwardly through diametrically opposed slots 56 in shoulder 52, and then twisting the entire filler assembly 32 so as to bring lugs 54 into engagement with the underside of shoulder 52 in the manner shown in FIGS. 3 and 4. Slots 56 in shoulder 52 are shown in FIG. 4. Gasket 58 provides a tight seal between adaptor 46 and shoulder 52. The lower end of adaptor 46 can be modified for coupling to any type of inlet fitting. For example, if the inlet fitting on a fuel tank is provided with pipe threads, then mating threads will be provided on the lower end of adaptor 46.

The upper end of fuel conduit 38 is connected to fuel line 14 by means of an elbow coupling 15 which is connected to hand valve 34 in fuel line 14 in the arrangement shown in FIG. 2. The passage means within filler assembly 32 communicating with vacuum tube 30 includes, in addition to tube 40, a tubular member 60 which is connected to vacuum tube 30 at its upper end and which has an open lower end 62 disposed a substantial distance downwardly within vacuum tube 40. In order to automatically terminate the flow of fuel into tank 4 from supply tank 2, I provide a float arrangement which is operative to close passage means 40 and 60 communicating vacuum tube 30 with the interior of tank 4. The float arrangement is responsive to a predetermined liquid level within the tank being filled, and may take various forms. In FIG. 3 I have shown one embodiment of shut-off arrangement utilizing a pair of float members such as corks 64. Floats 64 are housed within the lower end of vacuum tube 40 and are prevented from falling out of the bottom end thereof by a transverse bottom wall 65. As illustrated in the drawing, tube 40 serves as a chamber which confines the operation of floats 64 within it and guides the movement of floats 64 as they are elevated by the rising level of fuel in the tank being filled. It is to be noted that the lower end of tube 40 is provided with a plurality of apertures 66 through which air may be drawn from the top of tank 4 into tubular member 60 connected to vacuum tube 30. The lower end 62 of tubular member 60 serves as a valve port which remains open to permit air to be drawn from tank 4 into vacuum tube 30 through apertures 66 in vacuum pick-up tube 40 and tubular passage 60 as long as the liquid fuel level in tank 4 remains below a predetermined fill level. When the fuel in tank 4 rises to the desired level, floats 64 will be raised to a point where the top float will be in immediate proximity to port 62 and will be drawn into sealing engagement therewith by the suction effect from vacuum line 30. Thus, the floats 64 (being both a float and a float-actuated member drawn to the valve port) and the valve port at the lower end 62 of tubular member 60 form, in combination, a float-actuated vacuum shut-off valve. This shut-off valve serves as a further control element in the vacuum line.

The aforenoted arrangement for float 64 makes it essentially impossible for incoming fuel entering through passage 38 to strike float 64; but the arrangement permits rising fuel in the tank to enter the chamber housing float 64 after the internal end opening of fuel passage 38 is submerged below the level of the rising fuel. Thus it is that a single or sole interior opening at the end of the fuel passage 38 contributes to reduction of turbulence of the fuel in the tank being filled, and thereby reduces fuel foaming, especially after the end thereof is submerged. Excessive development of foam, especially during the last of the filling operation, could interfer with the operation of control elements such as the automatic float shut-off valve arrangement; and thus foaming is undesired.

Since the various types of inlet fittings on fuel tanks are of substantially different heights, it will be appreciated that the same fill level will not be achieved in all tanks with a fixed setting of the liquid level control device employed to close-off tubular passage 60 leading to vacuum tube 30. For example, if the float control is set to fill a tank having a long inlet fitting extending a substantial distance above the top of the tank, then the application of filler assembly 32 to a different tank having a very short inlet fitting would cause the flow of fuel to the second tank to be shut-off well before it has been filled to the top. In order to compensate for the height of the inlet fitting on the tank being filled so that it can be filled to the desired ful level, I have incorporated an adjustable fuel level feature within filler assembly 32. In the embodiment of my invention shown in FIG. 3, this feature takes the form of a vertically adjustable tubular member 60 which serves to connect vacuum pick-up tube 40 with vacuum line 30. Tubular member 60 is spaced inwardly from pick-up tube 40 as shown, and is guided therein by a slide collar or sleeve 68. At its upper end, tube 60 extends through a packing gland 70 which is secured to the top face of filler assembly plate 36 as by welding. A releasable fitting 72 embracing tubular member 60 is provided with external threads 73 by means of which it may be threadedly engaged with the upper end of packing gland 70. By turning fitting 72 down into gland 70, packing material 74 contained therein may be compressed and forced into tight, sealing engagement with tubular member 60. The tight engagement of packing material 74 with tubular member 60 serves to hold member 60 in the desired vertical position. In order to adjust tubular member 60 vertically within tank 4, it is only necessary to loosen fitting 72 from packing gland 70. Tubular member 60 can then be slidably adjusted upwardly or downwardly within guide sleeve 68 and gland 70 to raise or lower the position of vacuum inlet port 62 within tank 4 and thereby set the fill level for tank 4 as desired.

In FIGS. 5 and 6 I have illustrated the manner in which my vertically adjustable liquid level control device may be utilized with different heights of inlet fittings to insure the complete filling of a fuel tank. With the elongated relatively high inlet fitting 48a on tank 4a shown in FIG. 6, tubular vacuum passage 60 must be adjusted downwardly through elongated fitting 48a by loosening fitting 72 in order to position vacuum inlet port 62 slightly below the top of tank 4a. By adjusting tubular member 60 in this manner, tank 4a may be filled substantially to the top thereof as indicated by liquid level $L_1$ without overflowing through fitting 48a. If port 62 were positioned within fitting 48a liquid fuel would raise upwardly therein so quickly after filling tank 4a as to cause fuel to spill over the top of fitting 48a. In FIG. 5 there is illustrated a tank 4b having a relatively short inlet fitting 48b. If vacuum flow tube 60 were left in the downwardly extended position utilized for elongated fitting 48a of tank 4a, then inlet port 62 thereof would be positioned a substantial distance downwardly within tank 4b so as to preclude the complete filling thereof. To compensate for the short inlet fitting 48b it is necessary to loosen fitting 72 and slide tube 60 upwardly so that port 62 will be positioned just below the top of tank 4b. By so adjusting tube 60 and inlet port 62 thereof, level $L_2$ to which tank 4b is filled will be substantially the same as the full fill level $L_1$ to which tank 4a is filled.

When service vehicle 8 is not being used for fuel transfer operations, filler assembly 32 will be stored within fitting 16 of supply tank 2, as is indicated in phantom lines in FIG. 2. This storage arrangement not only provides a convenient means for securing filler assembly 32 during periods of nonuse but also insures that fuel conduit 38 and vacuum passages 40 and 60 will remain clean and free from foreign objects. When a filling operation is to be carried out, vehicle 8 is driven into position adjacent the vehicle being refueled, such as tractor 6 shown in FIG. 1. Filler assembly 32 is then removed from supply tank fitting 16 and coupled to inlet fitting 48 of vehicle fuel tank 4. With the engine of service vehicle 8 running, the transfer of fuel is initiated by opening valve 22 in vacuum line 30, and also making sure that hand valve 34 is in its open position. As air is drawn out of tank 4 through apertures 66 in pick-up tube 40, tubular member 60, and vacuum line 30 by the suction effect of suction manifold 26 of vehicle 8, the pressure within tank 4 will be reduced relative to that in tank 2. This pressure differential will cause fuel to flow through pick-up tube 10 and fuel line 14 from supply tank 2 to receiving tank 4. When the fuel in tank 4 reaches the predetermined liquid level for which adjustable tube 60 has been set, floats 64 will approach port 62 and be drawn into sealing contact therewith by the vacuum in line 30. With the closing of port 62 the pressure differential between tanks 2 and 4 will be lost and the flow of fuel through line 14 will be automatically terminated. Thereafter, hand valve 22 is turned off and the filler assembly removed from tank 4 and stored in tank 2.

As fuel is being discharged from conduit 38 into tank 4, bottom wall 65 which closes the lower end of perforated tube 40 prevents fuel vapor or liquid from being drawn upwardly into vacuum line 30 through tubular member 60. Apertures 66 in tube 40 are positioned sufficiently remote from the discharge end of fuel conduit 38 so as to avoid the suction of fuel therethrough.

While my improved liquid transfer apparatus has been shown and described with respect to particular embodiments thereof, those skilled in the art will readily appreciate that various changes can be made in the form and arrangement of the various parts without losing the benefits of my vacuum actuated, automatic shut-off, transfer apparatus.

For example, as illustrated in FIGS. 7 through 9, inclusive, vacuum line control valve 22', which is hand-operated valve, and pressure relief valve 28', may be incorporated in filler assembly 32' for manufacturing and operational convenience. It is to be noted that pressure relief valve 28' in all embodiments operates to open vacuum line 30' to the atmosphere to thereby permit the entry of air into vacuum line 30' to prevent tank 4 (see FIG. 2) from collapsing inwardly due to the development of an excessive vacuum condition therein. I also contemplate that tubular fuel and vacuum passages 38 and 40 could be formed in a single piece of bar stock (FIGS. 7-9) by machining or casting rather than taking the form of two separate tubes as shown in FIG. 3. Also an adjustable liquid level control means could be provided in other ways than by using vertically adjustable vacuum tube 60. A slidably adjustable float member 64' (see FIG. 9) could be utilized on a valve stem 78 which is carried upwardly by the float member 64' to seat a valve element 80, 81 and 82 on the stem 78 in the port 79 communicating with vacuum line 30'.

My liquid transfer apparatus has been described in conjunction with a fuel transfer operation. However, it is to be noted that my vacuum actuated fluid transfer device, and its automatic liquid level control feature, would be equally advantageous in transferring various types of fluids other than fuel. In the chemical industry in particular where corrosive chemicals pose a severe corrosion and wear problem for mechanical pumps, a vacuum flow device as described herein would be very useful.

My same flow apparatus as shown and described herein, may also be used without applying a vacuum to control the gravity filling of tanks where the supply tank is at a raised level above the receiving tank. For such applications, vacuum passage 60 would be left open to the atmosphere. When the float device closes port 62 in response to the attainment of the desired liquid level in the receiving tank, the flow of liquid thereinto will stop as the rising fuel level compresses air therein. Upon the termination of such a gravity filling operation, hand valve 34 is closed so that liquid will not drain out of transfer line 14 when it is removed from the receiving tank.

FIGS. 7-9, inclusive, illustrate a preferred structure of a composite filler assembly article formed using an elongated unitary body of material, specifically a single piece of bar stock, suitably metal or fuel resistant plastic, appropriately machined or cast, as aforenoted. Die casting in zinc or zinc alloys is especially preferred. The twist-tight closure means includes the locking lugs 44' projecting laterally from the axis of the bar stock, that is, radially outward from the axis thereof. Gasket 47' rests on the bottom surface of the head part 73' of the composite unit; and this bottom surface thus is analogous to the flange function of plate 36 of the embodiment in FIG. 3. Separate, and structurally independent, first and second passages, that is, fuel passage 38' and vacuum passage 60', pass perpendicularly through the plane of gasket 47' and are parallel downwardly therefrom, as is also characteristic of the structure illustrated in FIG. 3. Fuel passage 38' terminates in a single internal opening 74' which is at least as (and suitably more) distant downwardly from the closure means such as gasket 47' than any part of the vacuum passage 60', including the internal fluid access opening 75 for the vacuum passage. Access opening 75 is in the form of an elongated slot along one side (the outer side) of the enlarged portion 76 of the total vacuum passage; and the enlarged portion 76 forms a guide chamber (comparative to the space in tube 40 below the valve port at the internal end of tube 60, as shown in FIG. 3) for float 64'. The bottom of guide chamber 76 in FIGS. 7-9 has structural means therein to retain a float in it; and such means may comprise a closure plug threaded member 77 (or a cross bar) having a well recess at its interior or upper end. A free shaft 78 carries on it the float member 64', which may suitably be adjusted up or down on shaft 78 and frictionally held in adjusted position. Thus, adjustment of float 64' can be used to accomplish liquid level control, as aforediscussed, inasmuch as, by elevating float 64' on shaft 78, a greater height of fuel is permitted entry to a tank being filled before float 64' rises as a result of floating on the fuel. The rising of float 64' causes shaft 78 and the shut-off valve member at the end of it to rise within guide chamber 76.

The float-actuated vacuum shut-off valve in this assembly of FIGS. 7-9, inclusive, includes the valve port 79 at the portion of vacuum passage 60' where that passage expands to form chamber 76. Suitably, the outer or bottom surfaces of this valve port may and sometimes preferably are essentially flat (as, for example, illustrated at the end 62 of tube 60 in FIG. 3); but it is also contemplated that the expansion from port 79 to the walls of guide chamber 76 may be beveled or flared outwardly and slightly downwardly to the connection with the walls of the guide chamber 76. Also to be noted is that all portions of the vacuum passage system below the valve port are enlarged.

The total shut-off valve assembly further includes a pointed shaft alignment element 80 adapted to be fully received within the vacuum inlet valve port 79. An annular shoulder 81 is located at the base of alignment number 80; and on this shoulder is a flexible gasket 82 for sealing engagement with inlet port 79. The flexible gasket as part of the combination makes it especially effective to form a suction-tight or air-tight seal; thus, after the vacuum shut-off valve is closed, the refueling of the tank automatically terminates; and this is accomplished without the need for an attendant. At any suitable later time the filler assembly is removed and stored in the supply tank opening 18.

Float 64' in FIGS. 7-9 preferably comprises a plastic member (resistant to degradation by fuel) in the shape of an inverted sleeve with its upper end plugged. Its density may be, if desired, greater than that of the fuel; but entrapped air under its skirt portion as the fuel level rises from the bottom causes the float member to act as a true float.

A coil spring 83 suitably biases relief valve closure member 84, preferably located in head 73', against the opening 85 to the atmosphere for the relief valve. Thus the relative environmental orientation of a relief valve biased in closed position by a spring, as illustrated, does not affect its operational function. It is effective to keep out atmospheric air until a sufficient reduction of pressure in the tank is achieved (which in an air-tight system, as illustrated, takes place rapidly) to effect flow of fuel thereinto, while it at the same time permits bleeding entry of atmospheric air after adequate vacuum fuel flow is underway, and thereby prevents the vacuum conditions in the tank from reaching a level causing collapse of the tank. In effect, therefore, tight seals are needed to effect rapid initiation of fuel transfer; but thereafter, it is important to bleed in atmospheric air to limit the degree of vacuum to which the tank being filled is subjected. A coil spring (pre-set to yield at any suitable predetermined pressure differential condition) is especially effective for the purpose of limiting the degree of vacuum and is more or less instantly effective to close the relief valve when the vacuum condition for fuel transfer is below a predetermined optimum. If desired, the relief valve may be equipped with a screen or other filter member to keep out dust or foreign particles.

To reduce leakage of atmospheric air in the system, the hand operated valve member 22', opened by pulling it outwardly a short distance from the position illustrated in FIG. 9, is suitably equipped with a ring seal or O-seal member 85. To be noted is the relative relationship between the hand valve 22' and the relief valve 28' in the vacuum system. Once hand valve 22' is closed, further air intake by suction through vacuum line 30' should cease, so as to permit operation of the engine for the supply vehicle at normal efficiency.

The exterior opening 86 of the fuel passage 38' in FIG. 9 is illustrated with threaded connecting means for affixing a fuel line thereto.

FIG. 10 shows a further view of one type of adaptor 87 for coupling use. The adaptor is equipped with coupling elements 88 and 89 at its upper end. Specifically, notches 89 into the upper rim edge of adaptor 87 are adapted to receive lugs 44'; and a twist-tight motion slides lugs 44' underneath cam members 88 depending from the upper rim of the adaptor. Gasket 47' then rests between the upper rim of the adaptor and the base surface or underlying plate portion of the head 73 of the filler assembly 32'. As will be understood, coupling elements on the filler assembly 32' and the upper part of adaptor 87 might be reversed, with the lugs carried on the adaptor and the notches on the filler assembly.

The lower part of adaptor 87 illustrated in FIG. 10 includes lug members 90 projecting radially outward from collar 94, plus a gasket 92 resting against annular ring or plate member 91. Thus the lower part of the specific adaptor illustrated in FIG. 10 is designed for use in a pre-existing inlet fuel tank fitting 93 which is similar in character to the upper part of adaptor 87, but larger. A wide variation may exist amongst the adaptors potentially useful in the practice of the invention—the key requirement being coupling means on the upper and lower part thereof for tight sealing coupling engagement with, respectively, a filler assembly and the pre-existing inlet member of a tank to be filled.

The twist-tight feature for the filler assembly is especially critical. That assembly, in use, will ordinarily have the fuel and vacuum lines more or less permanently attached thereto, thus making any effort at screw threaded coupling of the same to an inet an exercise in frustration if not futility, whereas twist-tight coupling is not only quick and convenient but entirely effective as taught herein. Further, twist-tight closure is necessary for essentially automatic operation without need for operator monitoring and watching or holding of the filler assembly. The weight of fuel line alone, but especially as fuel passes through it, makes "vacuum" holding impractical and makes positive twist-tight "locking" critical for the fuel transfer operation.

That which is claimed is:

1. Apparatus for transferring fuel by suction to a vehicle fuel tank comprising:
   1. a fuel supply tank mounted on a service vehicle powered by an engine having a suction manifold,
   2. a flexible fuel supply line having one end connected to said supply tank through an aperture therein,
   3. a flexible vacuum line connected at one end to said suction manifold of said service vehicle,
   4. an inlet coupling member on said vehicle fuel tank, and
   5. a composite filler assembly article fitted on said vehicle fuel tank at said inlet coupling member, said filler assembly article consisting essentially of:
      a. twist-tight closure means for removable fluid-tight sealing engagement of said filler assembly article on said inlet coupling member, said closure means including locking means for engagement with said inlet coupling member, with separate gasket means lying in a plane between surfaces of said inlet coupling member and said closure means,
      b. a unitary body of material fixed to said closure means, with said closure means axially lateral on said unitary body, said unitary body having separate and independent first and second passages therein disposed laterally with respect to each other, each said passage being disposed and passing perpendicularly through the plane of said gasket means and extending substantially in parallel downwardly therefrom, one said downwardly extending passage being larger in cross section than the other, said larger passage being a fuel passage and said other passage being a vacuum passage, each said passage having an internal opening for interior communication inside said vehicle fuel tank and an external opening for exterior communication outside said vehicle fuel tank, whereby each said passage provides means for fluid communication between the interior and exterior of said vehicle fuel tank as said composite filler assembly article is removably attached thereto,
         i. said fuel passage being characterized by being substantially uniform in cross section downwardly from said closure means, and by having its entire internal opening at least as distant downwardly from said closure means than any part of said vacuum passage as well as any internal fluid access opening for said vacuum passage,
         ii. said vacuum passage being characterized by having a single vacuum inlet valve port disposed for communication within said vehicle fuel tank at a location above said entire internal opening of said fuel passage, and by having portions thereof below said single vacuum inlet valve port enlarged to form a guide chamber for float means, with means at the bottom of said chamber to retain said float means therein, and with internal fluid access opening to said chamber from portions of said chamber lateral thereto, whereby fuel entering said vehicle fuel tank as suction transfer takes place does not enter said chamber until said internal opening of said fuel passage is submerged below the level of fuel rising in said vehicle fuel tank,
      c. means connecting the other end of said flexible fuel supply line to the external opening of said fuel passage,
      d. means connecting the other end of said flexible vacuum line to the external opening of said vacuum passage,
      e. and said composite filler assembly article additionally including control means for the vacuum passage thereof, said control means consisting essentially of:
         i. a float-actuated vacuum shut-off valve assembly which includes the aforesaid single vacuum inlet valve port and a float-actuated member which is drawn into sealing engagement therewith when the level of fuel in said vehicle fuel tank raises said float-actuated member to said valve port, said float-actuated member having said aforesaid float means operably confined within the aforesaid guide chamber and thereby protected from being struck by incoming fuel from said internal opening of said fuel passage,
         ii. a manually operated hand valve accessible for operator control at the exterior of said composite filler assembly as said filler assembly is removably attached to said vehicle fuel tank, said hand valve being operable for opening and closing communication of said vacuum passage to said vacuum line; and
         iii. pressure relief valve means in said vacuum passage intermediate said shut-off valve and said hand valve, said pressure relief valve means being automatically operable under predetermined conditions to allow air of the atmosphere exterior to said vehicle fuel tank to enter said vacuum passage and thereby limit the vacuum condition within said vehicle fuel tank to a level not causing collapse of said tank.

2. The apparatus of claim 1 wherein said inlet coupling member on said vehicle fuel tank includes an adaptor having coupling elements at its upper end with which said twist-tight closure means on said filler assembly article engages to form a fluid-tight seal, said adaptor having coupling elements on its lower end constructed and arranged to mate with and detachably connect in sealing engagement to the particular inlet fitting pre-existing on said vehicle fuel tank, said pre-existing fitting being one with which said twist-tight closure means on said filler assembly article does not engage to form a fluid-tight seal.

3. The apparatus of claim 1 wherein the pressure relief valve means comprises a biased valve closure member.

4. A composite filler assembly article for removable attachment at the inlet of a fuel tank for suction refueling of the same, said filler assembly article consisting essentially of
   a. twist-tight closure means for removable fluid-tight sealing coupling engagement of said composite filler assembly article at the inlet of said fuel tank, said closure means including locking means for engagement at said inlet, with separate gasket means lying in a plane,
   b. a unitary body of material fixed to said closure means, with said closure means axially lateral on said unitary body, said unitary body having separate first and second passages therein disposed laterally with respect to each other, each said passage being disposed and passing perpendicularly through the plane of said gasket means and extending substantially in parallel downwardly therefrom, one said downwardly extending passage being larger in cross section than the other, said larger passage being a fuel passage and said other passage being a vacuum passage, each said passage having an internal opening for interior communication inside said tank and an external opening for exterior communication outside said tank, whereby each said passage provides means for fluid communication between the interior and exterior of said tank as said composite filler assembly article is removably attached to said tank,
      i. said fuel passage being characterized by being substantially uniform in cross section downwardly from said closure means, and by having its entire internal opening at least as distant downwardly from said closure means than any part of said vacuum passage as well as any internal fluid access opening for said vacuum passage,
      ii. said vacuum passage being characterized by having a single vacuum inlet valve port disposed for communication within said tank at a location above said entire internal opening of said fuel passage as said composite filler assembly is removably attached to said tank, and by having all portions thereof below said single vacuum inlet valve port enlarged to form a guide chamber for float means, with means at the bottom of said chamber to retain said float means therein, and with internal fluid access opening to said chamber from portions of said chamber lateral thereto, whereby fuel entering said fuel tank as suction filling takes place does not enter said chamber until said internal opening of said fuel passage is submerged below the level of fuel rising in said tank,
   c. means for affixing a flexible fuel supply line to the external opening of said fuel passage,
   d. means for affixing a flexible vacuum line to the external opening of said vacuum passage,
   e. and said composite filler assembly article additionally including control means for the vacuum passage thereof, said control means consisting essentially of:
      i. a float-actuated vacuum shut-off valve assembly which includes the aforesaid single vacuum inlet valve port and a float-actuated member which is drawn into sealing engagement therewith when the level of fuel in said tank raises said float-actuated member to said valve port, said float-actuated member having said aforesaid float means operably confined within the aforesaid guide chamber and thereby protected from being struck by incoming fuel from said internal opening of said fuel passage,
      ii. a manually operated hand valve accessible for operator control at the exterior of said composite filler assembly as said filler assembly is removably attached to said tank, said hand valve being operable for opening and closing communication of said vacuum passage to said vacuum line; and
      iii. pressure relief valve means in said vacuum passage intermediate said shut-off valve and said hand valve, said pressure relief valve means being automatically operable under predetermined conditions to allow air of the atmosphere exterior to said tank to enter said vacuum passage and thereby limit the vacuum condition within said tank to a level not causing collapse of said tank.

5. In combination with claim 4, a fuel tank having a pre-existing inlet fitting with which said twist-tight closure means on said filler assembly article does not engage to form a fluid-tight seal, an adaptor on said pre-existing inlet fitting, said adaptor having elements on its lower end constructed and arranged to mate with and detachably connect in sealing engagement to said pre-existing inlet fitting, and said adaptor having elements at its upper end with which said twist-tight closure means on said filler assembly article forms a fluid-tight coupling engagement.

6. The article of claim 4 wherein the pressure relief valve means comprises a spring biased valve closure member.

7. The article of claim 4 wherein said float-actuated vacuum shut-off valve assembly is characterized by the following additional features:
   a. said single vacuum inlet valve port is centrally located in said vacuum passage, and
   b. said float-actuated member comprises a pointed shaft alignment element adapted to be fully received within said vacuum inlet valve port, an annular shoulder at the base of said alignment element, and a flexible gasket member on said shoulder for sealing engagement with said inlet valve port.

8. The filler assembly article of claim 4 wherein said float-actuated vacuum shut-off valve assembly includes adjustable liquid level control means, said level control means comprising vertically adjustable means for adjusting the response of said shut-off valve assembly to the level of fuel in said tank.

9. The filler assembly article of claim 8 wherein said adjustable liquid level control means comprises means for adjusting the level of said single vacuum inlet valve port of said float-actuated valve assembly.

10. The filler assembly article of claim 8 wherein said adjustable liquid level control means comprises means for adjusting the level of the float means of said float-actuated member for said float-actuated valve assembly.

* * * * *